March 20, 1962 S. A. MURDOCK ETAL 3,026,288
GRAFT COPOLYMERS COMPRISED OF MIXTURES OF VINYL PYRIDINE
MONOMERS AND CERTAIN MONOMERIC SULFONIC ACID COMPOUNDS
ON CERTAIN N-VINYL-2-OXAZOLIDINONE COPOLYMER
SUBSTRATES, IMPROVED ACRYLONITRILE POLYMER
COMPOSITIONS OBTAINABLE THEREWITH, AND
METHOD OF PREPARATION
Filed Jan. 25, 1960

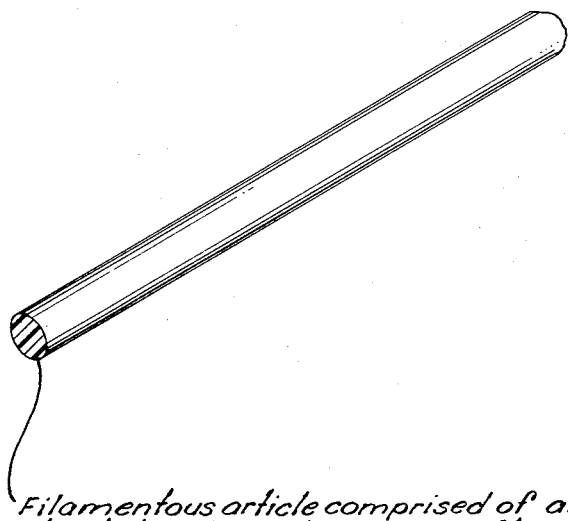

Filamentous article comprised of an acrylonitrile polymer having a graft copolymer of a mixture of a vinyl pyridine monomer and a monomeric organic sulfonic acid graft copolymerized upon an N-vinyl-2-oxazolidinone/vinyl lactam copolymer substrate incorporated therein.

INVENTORS.
Stanley A. Murdock
Teddy G. Traylor
Theodore B. Lefferdink
BY 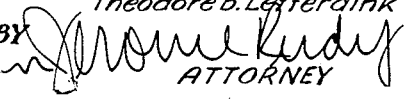
ATTORNEY United States Patent Office 3,026,288
Patented Mar. 20, 1962

3,026,288
GRAFT COPOLYMERS COMPRISED OF MIXTURES OF VINYL PYRIDINE MONOMERS AND CERTAIN MONOMERIC SULFONIC ACID COMPOUNDS ON CERTAIN N-VINYL-2-OXAZOLIDINONE COPOLYMER SUBSTRATES, IMPROVED ACRYLONITRILE POLYMER COMPOSITIONS OBTAINABLE THEREWITH, AND METHOD OF PREPARATION
Stanley A. Murdock, Concord, Calif., Teddy G. Traylor, Cambridge, Mass., and Theodore B. Lefferdink, Newport News, Va., assignors to The Dow Chemical Company, Midland, Mich., a corporation of Delaware
Filed Jan. 25, 1960, Ser. No. 4,500
16 Claims. (Cl. 260—45.5)

The present invention resides in the general field of organic chemistry and contributes specifically to the polymer art, especially with respect to certain water-insoluble graft copolymer compositions and fiber-forming polymer blends obtainable therewith. It is particularly concerned with graft copolymers of mixtures of different monomers that consist of certain vinyl pyridine monomers in admixture with certain monomeric organic sulfonic acid compounds, which monomeric admixtures are graft copolymerized upon or with preformed copolymer substrates of N-vinyl-2-oxazolidinones and N-vinyl lactams (hereinafter referred to as VO/VL copolymers), to form graft copolymeric products that have especial utility as dye-receptive, antistatic and stabilizing additaments for acrylonitrile polymer compositions which, advantageously, may be of the fiber-forming variety.

The invention is also concerned with the compositions that may be obtained by blending the graft copolymers with acrylonitrile polymers, as well as with shaped articles fabricated from such compositions and which, as a consequence, have significantly enhanced properties and characteristics as regards improvements in and relating to enhanced dye-receptivity, minimized inherent propensity to accumulate electrostatic charges, natural stability to various deteriorating influences, including stability against becoming deleteriously influenced and degraded upon exposure to heat at elevated temperatures and to light.

Within the scope and purview of the invention, there are comprehended (1) the various novel and utile graft copolymers of the indicated variety; (2) the advantageous polymer compositions, particularly fiber-forming compositions, obtained by blending or intimately mixing together the graft copolymers with acrylonitrile polymers; (3) various shaped articles fabricated from and comprised of the graft copolymer-containing acrylonitrile polymer compositions; and (4) methods for the preparation of the above-indicated compositions.

It is the main purpose and primary design of the present invention to provide and make available graft copolymers of admixtures of vinyl pyridine monomers and certain monomeric organic sulfonic acid compounds on preformed VO/VL copolymer substrates, which graft copolymers are especially well suited for being incorporated in acrylonitrile polymer compositions, particularly compositions of polyacrylonitrile, to serve in the indicated treble capacity of dye-assisting adjuvants, antistatic agents and stabilizing ingredients. It is also a principal aim and chief concern of the invention to provide and make available acrylonitrile polymer compositions and shaped articles therefrom that contain the above-indicated and hereinafter more fully delineated type of graft copolymeric additaments which compositions have, as intrinsic distinguishing characteristics, excellent receptivity of and acceptability for any of a wide variety of dyestuffs; permanently imbued antistatic properties that are unusually good for and not commonly encountered in polymeric materials of the synthetic, essentially hydrophobic varieties of such substances; and efficacious natural stability to heat and light, as well as to certain chemical conditions, such as alkaline environments.

The graft copolymers of the present invention which have the indicated capacity and utility as additaments for acrylonitrile polymer compositions are comprised of a preformed VO/VL copolymer trunk or base substrate upon or with which there is graft copolymerized a mixture of monomers consisting of vinyl pyridine monomers in combination or admixture with certain monomeric, alkenyl group-containing organic sulfonic acids or derivatives thereof.

The polymer blend compositions of the present invention which fulfill the above-indicated ends and offer corollary advantages and benefits, particularly as fiber-forming compositions as will hereinafter be manifest, are, in essence, comprised of an intimate and practically inseparable blend, mixture or alloy constitution of (A) an acrylonitrile polymer that contains in the polymer molecule at least about 80 weight percent of acrylonitrile, any balance being copolymerized units of at least one other ethylenically unsaturated monomeric material that is copolymerizable with acrylonitrile to provide fiber-forming acrylonitrile polymer products and which, most advantageously, is polyacrylonitrile and (B) a minor proportion of the above-indicated variety of beneficial graft copolymeric additament that functions in the desired manner.

The methods of the invention by which the herein contemplated advantageous compositions may be made involve preparation of the graft copolymer, as well as incorporation of a minor proportion of the graft copolymer product as a beneficial additament in and with the acrylonitrile polymer base by any of several beneficial techniques, hereinafter more thoroughly defined, adapted to suitably accomplish the desired result.

Without being limited to or by the specific embodiments and modes of operation set forth, the invention is exemplified in and by the following didactic illustrations wherein, unless otherwise indicated, all parts and percentages are to be taken on a weight basis.

ILLUSTRATION "A"

Into a 50 liter flask equipped with an efficient agitator, a nitrogen sparger and a total reflux condenser there is charged about 2.22 kilograms of a 47.36 percent aqueous solution of a copolymer of N-vinyl-5-methyl-2-oxazolidinone (VO-M) and N-vinyl-2-pyrrolidone (VP) copolymerized in a 30:70 respective weight ratio and having a Fikentscher K-value of about 30. About 7.0 kilograms of water and 15 ml. of concentrated (38 percent) hydrochloric acid is added to the VO-M/VP copolymer solution. The resulting acidified aqueous solution is brought to the boil and nitrogen is then sparged into the reaction mass in the reactor. The nitrogen sparging is continued through the ensuing reaction.

Over a 2-hour period there is continuously fed into the stirred reaction mass about 736 ml. of 0.612 percent aqueous hydrogen peroxide solution and 7.264 liters of an aqueous monomer feed containing a mixture of monomers consisting of about 717 grams of 41.6 percent active sodium styrene sulfonate (SSS) and 161 grams of 94.4 percent active 2-vinyl pyridine (VPr). After the entire quantities of the monomer and catalyst solutions are charged to the reactor, the heating is continued and the temperature of the reaction mass is maintained at the boil for about three-quarters of an hour. At this point, an additional one ml. quantity of 30 percent aqueous hydrogen peroxide is added and the mixture maintained at the boil for an additional 45 minutes.

The reaction is then terminated and the graft copolymer product removed from the reactor as a stable white aqueous dispersion of the water-insoluble additament in water. The aqueous dispersion contains about 9.5 percent of water-insoluble polymer solids. Upon analysis, it is found that about 93 percent of the mixture of monomers is converted to a graft copolymer product with the VO-M/VP copolymer and that the graft copolymer product contains about 10 percent of graft copolymerized VPr units; about 19 percent of polymerized SSS units; and about 71 percent of the VO-M/VP copolymer substrate.

Polyacrylonitrile fibers containing about 10 percent of the above copolymer product are prepared by impregnating filamentary structures in aquagel condition (after having been salt-spun) in and with aqueous dispersions of the copolymer that, in three sequential stages, contained about 1.5, 0.5 and 0.1 percent of the graft copolymer solids, respectively. The polyacrylonitrile aquagel fiber employed is obtained by extruding a spinning solution of fiber-forming polyacrylonitrile comprised of about 10 parts of the polymer dissolved in 90 parts of a 60 percent aqueous solution of zinc chloride through a spinnerette having 750 individual 6 mil diameter orifices into an aqueous coagulating bath that contains about 43 percent of dissolved zinc chloride to form a multiple filament tow. After being spun, the tow bundle of coagulated polyacrylonitrile aquagel fiber is washed substantially free from salt upon being withdrawn from the coagulating bath and then wet-stretched in the sequential impregnating baths at the boil for orientation with simultaneous impregnation. The fiber is thus stretched to a total stretched length that is about thirteen times (13×) its original extruded length. The aquagel fiber which contains about two parts of water to each part of polymer therein, is also simultaneously impregnated with the graft copolymer to the indicated extent during the stretching.

Following the impregnation, the aquagel fiber is irreversibly dried at 150° C. to destroy the water-hydrated structure and convert it to a finished fiber form. The finally obtained 3 denier fiber product has a tenacity of about 4.0 grams per denier, an elongation of about 30 percent, a dry yield strength of about 0.9 gram per denier. The graft copolymer-containing acrylonitrile polymer fiber product has excellent natural stability to heat and light as well as against becoming degraded under the influence of aqueous alkaline media at pH levels as high as 10. It is nearly free of propensity to accumulate charges of static electricity upon handling.

In addition, the graft copolymer-containing sample is of good color and hand and is dyeable with all classes of dyestuffs as applied under normal dyeing conditions.

The fiber product dyes well to deep and level shades of coloration with Calcodur Pink 2BL, a direct type of dyestuff (Colour Index Direct Red 75, formerly Colour Index 353) and Sevron Brilliant Red 4G, a basic dye formerly known as Basic Red 4G (Colour Index Basic Red 14).

The dyeing with Calcodur Pink 2BL is performed at the 4 percent level according to conventional procedure in which the fiber sample is maintained for about one hour at the boil in the dye bath which contains the dyestuff in an amount equal to about 4 percent of the weight of the fiber (OWF), as understood in the art, OWF designates on the dry weight of the fiber, for instance, as defined in U.S. Patent No. 2,931,694. The dye bath also contains sodium sulfate (i.e. Glauber's salt) in an amount equal to about 15 percent OWF and has a bath-to-fiber weight ratio of about 30:1, respectively. After being dyed, the fiber is rinsed thoroughly with water and dried for about 20 minutes at 80° C.

The dye-receptivity of the Calcodur Pink 2BL-dyed fiber is then evaluated spectrophotometrically by measuring the amount of monochromatic light having a wave length of about 520 millimicrons from a standard source that reflects from the dyed sample. A numerical value, on an arbitrarily designated scale from zero to one hundred, is thereby obtained. This value represents the relative comparison of the amount of light that is reflected from a standard white tile reflector that has a reflectance value of 316 by extrapolation from the 0–100 scale. Lower reflectance values are an indication of better dye-receptivity in the fiber. For example, a reflectance value of about 20 to 25 to 50 or so for acrylonitrile polymer fibers dyed with 4 percent Calcodur Pink 2BL is generally considered by those skilled in the art to be representative of a degree of dye-receptivity that readily meets or exceeds the most rigorous practical requirements and is ordinarily assured of receiving general commercial acceptance and approval. The 4 percent Calcodur Pink 2BL reflectance value of the copolymer-containing fiber product is about 20.

The antistatic properties of the copolymer-containing fiber are then determined by measuring the electrical conductance of the fiber product at various humidities. As is also appreciated by those who are skilled in the art, the basis for such a test is that all fibers have a tendency to generate static electricity upon being handled. Only those that are possessed of sufficient electrical conductance to dissipate the charge as quickly as it forms are not hampered by the bothersome effects of static electricity. Thus, a measure of the electrical conductance of a fiber is a good indication of its ability to dissipate static electricity. The conductivities of the various fiber samples tested are found by determining their electrical resistances. Resistance, of course, is the reciprocal quantity of conductivity. In order to permit various fiber samples to be compared on a common basis, the conductivities of the samples tested are actually measured as volume resistivities according to the following formula:

$$\text{Volume resistivity} = \frac{(\text{Resistance})(\text{Cross-sectional area})}{\text{Path length between electrodes to which sample being tested is attached}}$$

The units of volume resistivity are ohm-cm.²/cm.

Prior to being tested, the graft copolymer-containing polyacrylonitrile fiber prepared in the indicated manner is vat dyed in the conventional manner with Cibanone Green BF Dbl. Paste (Colour Index Vat Green No. 1). A portion of the vat dyed sample is then subjected to five (5) consecutive No. 3-A accelerated wash tests in accordance with the American Association of Textile Chemists and Colorists (AATCC) Manual. The actual resistivities of the merely vat dyed sample as well as that of the sample that is both vat dyed and scoured are then determined (after the samples being tested are conditioned for seventy-two hours at the particular temperature and relative humidity conditions involved in each of the tests) by tautly connecting a web-like sample of the yarn between two electrodes, each of which are 9 centimeters long spaced parallel 13 centimeters apart, and across which there is applied a 900 volt direct current potential. For purposes of comparison, the volume resistivities of cotton, wool and an unmodified polyacrylonitrile fiber (obtained in the same way as the copolymer-containing fiber but without having the polymeric additament incorporated therein) are also tested in the indicated manner along with the graft copolymer-containing fiber in accordance with the present invention.

The results are set forth in the following tabulation which indicates the volume resistivities obtained at various relative humidities (R.H.) at 23° C. of each of the samples tested.

Table 1
VOLUME RESISTIVITIES OF VARIOUS FIBER SAMPLES COMPARED TO POLYACRYLONITRILE FIBERS IMPREGNATED WITH GRAFT COPOLYMER OF VPr AND SSS ON VO-M/VP COPOLYMER SUBSTRATE

| Sample | Volume Resistivity ohm-cm.²/cm. | |
| --- | --- | --- |
|  | 47 percent R.H. | 66 percent R.H. |
| Scoured graft copolymer-containing fibers | $1.2 \times 10^{10}$ | $8 \times 10^7$ |
| Cotton | $2.7 \times 10^8$ | $5.4 \times 10^6$ |
| Wool | $2 \times 10^{11}$ | $3.3 \times 10^9$ |
| Unmodified polyacrylonitrile fiber | $2.7 \times 10^{13}$ | $1.2 \times 10^{12}$ |

As is apparent in the foregoing, the graft copolymer-containing sample, even after being severely scoured, has electrical conductance properties much superior to ordinary polyacrylonitrile and only slightly poorer than cotton. At the same time, the physical properties of the graft copolymer-containing fiber are excellent, being about equal to those of the unmodified polyacrylonitrile fiber.

ILLUSTRATION "B"

Following the general procedure of the first illustration, the following reaction mass is prepared and polymerized with efficient agitation at 60° C. for 16 hours:

| | |
| --- | --- |
| 44.5 percent active SSS, grams | 87.5 |
| 94.4 percent active VPr, grams | 20 |
| 45 percent active 30:70 VO-M/VP copolymer (Fikentscher K-value 52), grams | 222 |
| 30 percent aqueous hydrogen peroxide, ml. | 1.5 |
| Water, ml. | 1000 |

The reaction mass prior to the polymerization is acidified to about pH 3 with concentrated hydrochloric acid and the graft copolymerization conducted with the reaction mass out of contact with air. The product, after polymerization, is obtained as a milky white suspension containing about 11.5 percent of dispersed solids of a water-insoluble graft copolymer product which, upon analysis, is found to contain about 24 percent of polymerized SSS units; about 11 percent of polymerized VPr units; and about 65 percent of the VO-M/VP copolymer substrate. Impregnation of the copolymer product into acrylonitrile polymer fibers in the manner set forth in the first illustration provides excellent results commensurate with those demonstrated with respect to the improvement in dye-receptivity of the fiber, reduction of its static characteristics and enhancement of its stability to heat and light.

Excellent results commensurate with those set forth in the preceding illustrations may also be obtained when the foregoing is repeated to prepare graft copolymer additives from other VO/VL copolymer substrates, such as copolymers of N-vinyl-5-ethyl-2-oxazolidinone and VP; copolymers of N-vinyl-2-oxazolidinone and VP; copolymers of VO-M and N-vinyl caprolactam; copolymers of VO-M and N-vinyl piperidone; and so forth.

These N-vinyl-2-oxazolidinone copolymers and their preparation are discussed in U.S. Patents 2,946,772, filed February 27, 1958; and 2,948,708, filed April 3, 1958.

Results similar to those set forth in the foregoing can likewise be obtained when the graft copolymer additaments are incorporated in polyacrylonitrile and other acrylonitrile polymer fibers to provide articles in accordance with the present invention by blending the graft copolymer and the fiber-containing acrylonitrile polymer in a spinning composition or dope prior to its extrusion into filamentary products by either wet spinning or dry spinning techniques. In such instances, incidentally, it may be desirable (in order to secure optimum benefit in the practice of the invention), to employ relatively larger quantities of the graft copolymeric additament than when surface impregnation is performed so that the presence of effective quantities of the additament at or near the peripheral portion of the article is assured.

The vinyl pyridine monomers that are employed in the practice of the present invention for the preparation of the graft copolymer products may be any of those of the general formula:

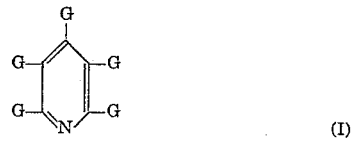

(I)

wherein one of the symbols G represents a vinyl (—CH=CH₂) radical or group and the remainder are independently selected from the group consisting of hydrogen or alkyl radicals containing from 1 to about 3 carbon atoms. Besides VPr (i.e., 2-vinyl pyridine), such monomers as 2-vinyl-4-methyl pyridine and 2-vinyl-4-ethyl pyridine may be employed with particular benefit in the practice of the present invention.

The monomeric sulfonic acid compounds that are employed for the preparation of the graft copolymer products in combination with the vinyl pyridine monomers are monomeric, alkenyl group-containing, organic sulfonic acids or derivatives thereof that are selected from the group of such compounds (including mixtures thereof) consisting of those represented by the formulae:

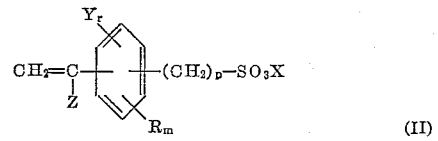

(II)

(Aromatic organic sulfonic acid compounds)

$$CH_2=CH-(CH_2)_m-SO_3X \qquad (III)$$

(Alkenyl organic sulfonic acid compounds)

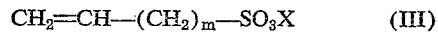

(IV)

(Sulfoalkylacrylate compounds)

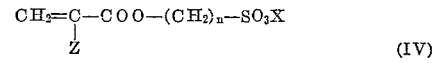

(V)

(Acryloyl taurine homolog compounds)

and

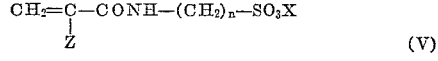

(VI)

(Allyl taurine homolog compounds)

all wherein X is hydrogen, an aliphatic hydrocarbon radical containing from 1 to 4 carbon atoms or an alkali metal (including sodium, potassium and lithium); Y is hydrogen, chlorine or bromine; R is methyl or ethyl; Z is hydrogen or methyl; $m$ has a numerical value in whole number increments from 0 to 2; $n$ has a numerical value of 1 or 2; $p$ is 0 or 1; and $r$ is 1 to 4.

Besides those specifically illustrated herein, other organic sulfonic acid compounds may also be utilized for the preparation of the graft copolymer products of the present invention such, by way of illustration, as those which are set forth in the disclosure of United States Letters Patent No. 2,527,300. In addition to the graft copolymers specifically described in the foregoing examples, other additaments that may advantageously be employed in the practice of the present invention include graft copolymers of (a) various vinyl pyridine monomers, particularly VPr and 2-vinyl-4-methylpyridine in admixture with such monomeric organic sulfonic acid compounds as 2-propene sulfonic acid, sodium paravinylbenzene sulfonate; 2- and/or 3-sulfopropyl acrylate; α-sulfoacrylic acid; sodium vinyl toluene sulfonate; potassium ortho-chlorostyrene sulfonate; 2-hydroxy-3-sulfopropyl acrylate, sodium salt; sodium 3-allyloxyl-2-hydroxypropane sulfonate; 4-sulfophenyl acrylate, sodium salt; N-allyl imino di-(2-ethane sulfonic acid); and the like, upon a (b) preformed VO/VL copolymer substrate, including, in particular, copolymers of VO-M with VP and copolymers of VO-M with N-vinyl caprolactam.

Still other monomeric organic sulfonic acid compounds that may be employed are as set forth in the following representative (but by no means exhaustive) listing, wherein they are grouped according to the above-designated types:

Aromatic alkenyl-containing sulfonic acid compounds (Formula II):

Para-styrene sulfonic acid
Ortho-styrene sulfonic acid
Para-isopropenyl benzene sulfonic acid
Para-vinylbenzyl sulfonic acid
Ortho-isopropenyl benzyl sulfonic acid
Sodium para-styrene sulfonate
Potassium ortho-styrene sulfonate
Methyl para-styrene sulfonate
Ethyl para-vinyl benzyl sulfonate
Ortho vinyl benzene sulfonic acid
Isopropyl ortho-isopropenyl benzene sulfonate
n-Butyl ortho-styrene sulfonate
Tertiary butyl para-styrene sulfonate
2-chloro-4-vinyl benzene sulfonic acid
4-bromo-2-isopropenyl benzene sulfonic acid
3-vinyl toluene 6-sulfonic acid, sodium salt
2-ethyl-4-vinyl-benzene sulfonic acid
2,3-dichloro-4-vinyl benzene sulfonic acid
2,3,5-tribromo-4-vinyl benzene sulfonic acid
2-chloro-3-vinyl-toluene-6-sulfonic acid
2,3-diethyl-4-vinyl-benzyl sulfonate, sodium salt Alkenyl sulfonic acid compounds (Formula III):

Ethylene sulfonic acid
Sodium ethylene sulfonate
Potassium ethylene sulfonate
Methyl ethylene sulfonate
Isopropyl ethylene sulfonate
1-propene 3-sulfonic acid
1-propene 1-sulfonic acid, sodium salt
1-propene 2-sulfonic acid, ethyl ester
1-butylene 4-sulfonic acid, n-butyl ester
1-butylene 3-sulfonic acid
Tertiary butylene sulfonic acid Sulfoalkylacrylate compounds (Formula IV):
Sulfomethylacrylate
2-sulfoethylacrylate
Sulfomethylmethacrylate, sodium salt
2-sulfoethylmethacrylate, methyl ester
2-sulfoethylmethacrylate, potassium salt Acryloyl taurine and homologous compounds (Formula V):

N-acryloyl taurine
N-acryloyl taurine, sodium salt
N-methacryloyl taurine, methyl ester
N-methacryloyl taurine, potassium salt
N-acryloyl taurine, ethyl ester
N-acryloyl-aminomethane sulfonic acid
N-methacryloyl-aminomethane sulfonic acid, sodium salt
Methyl N-methacryloyl-aminomethane sulfonate Allyl taurine and homologous compounds (Formula VI):

Allyl taurine
Allyl taurine, sodium salt
Allyl taurine, potassium salt
Methallyl taurine
Methallyl taurine, methyl ester
Methallyl taurine, isopropyl ester
N-allyl-aminomethane sulfonic acid
Sodium N-allyl-aminomethane sulfonate
Lithium N-methallyl-aminomethane sulfonate
n-Butyl N-allyl-aminomethane sulfonate The copolymers of N-vinyl-2-oxazolidinones (i.e., VO's) and N-vinyl lactams (i.e., VL's) that are utilized as preformed subtrates in the preparation of the graft copolymeric additaments of the present invention are copolymers of (1) between about 10 and about 90 weight percent, based on the weight of the copolymer molecule, advantageously between about 40 and 60 weight percent, of polymerized N-vinyl-2-oxazolidinone and (2) between about 90 and 10 weight percent, based on the weight of the copolymer molecule, advantageously between about 60 and 40 weight percent, of polymerized N-vinyl lactam.

The monomeric N-vinyl-2-oxazolidinones employed for preparation of the VO/VL copolymer substrate are of the general structure:

wherein each R is independently selected from the group consisting of hydrogen, alkyl radicals (including haloalkyl) of from 1 to about 4 carbon atoms, and aryl radicals of from 6 to about 10 carbon atoms. Advantageously, ring-substituted N-vinyl-2-oxazolidinones are employed, particularly those having a single alkyl or aryl substituent in the 5-position of the ring such as N-vinyl-5-methyl-2-oxazolidinone (VO–M); N-vinyl-5-ethyl-2-oxazolidinone (VO–E); N-vinyl-5-phenyl-2-oxazolidinone (VO–P); and so forth. Of course, if desired, non-ring-substituted N-vinyl-2-oxazolidinone may also be employed.

The N-vinyl lactam monomers that are utilized in the preparation of the preformed VO/VL copolymer substrates may be any of those (or their mixtures) which are variously characterized and generically known to the art as N-vinyl lactams or 1-vinyl lactams. Such monomers are disclosed and contemplated in United States Letters Patents Nos. 2,265,450; 2,371,804; and 2,335,454. Beneficially, the N-vinyl lactams that are employed are N-vinyl-2-pyrrolidone (VP), also known as N-vinyl-2-pyrrolidinone; N-vinyl-piperidone (VPip); N-vinyl caprolactam (VC); N-vinyl-5-methyl-2-pyrrolidone (VP-M); and the like, particularly VP.

It is desirable for the VO/VL copolymer that is used to be a water-soluble material. In cases where certain ring-substituted VO's are employed, such as VO–M, VO–E and VO–P, it is generally beneficial for the copolymer to contain at least about 40 weight percent of the VL copolymerized therein. Copolymers having substantially less VL may tend to water-insolubility and make it necessary to work with a product that may have a cloud (or precipitation) point in water or other aqueous solution beneath the boil. Copolymers containing from about 10 to about 30 weight percent VO are generally water-soluble at normal room temperatures (i.e., 20–25° C.) at solution concentrations as great as 20–30 weight percent, and frequently greater.

The graft copolymers of the present invention may generally be prepared by methods of polymerization, such as those which have been demonstrated in the foregoing illustrative examples, that employ such polymerization catalysts as persulfates, organic and inorganic peroxide and azo type materials in quantities that are conventional for such uses. The graft copolymers may oftentimes be prepared by polymerizing the monomeric constituent onto or with the preformed polymer trunk or base substrate under the influence of high energy irradiation, such as by means of X-rays and the like. The graft copolymers may be prepared in both aqueous and organic solvent vehicles using temperatures for the desired polymerization that may vary from about room temperature to the boiling point of the polymerization mixture. It is ordinarily satisfactory to conduct the reaction at a temperature of about 50 to 80 or 100° C. Usually, depending on the specific factors that may be involved, the graft copolymerization may be accomplished satisfactorily within a time period of about 10 to 60 hours.

The compositions of the graft copolymeric additament that is utilized can vary within rather wide limits. The content of the graft copolymerized mixed monomeric constituents may advantageously be between about 20 and 80 weight percent, with the balance of the graft copolymer product consisting of from 80 to 20 percent by weight of the preformed VO/VL copolymer substrate upon which the admixed monomeric constituents are graft copolymerized. In many cases, especially to secure optimum dye-receptivity, nearly equivalent or about commensurate or equal proportions of the graft copolymerized mixture of monomers and the preformed VO/VL copolymer substrate may be employed in the preparation of the graft copolymeric additaments.

The mixture of the monomers that is utilized may consist of from 10 to 90 mole percent of either monomeric constituent (i.e., for example, from 10 to 90 mole percent of the vinyl pyridine monomer with from 90 to 10 mole percent of the monomeric organic sulfonic acid compound). In many cases it is more advantageous for the mixture of monomers to be comprised of from about 30 to 70 mole percent of either of the monomeric constituents.

The polymerization system that is employed for the preparation of the graft copolymers used in practice of the present invention may consist of as much as 50 weight percent of the reactive ingredients to be polymerized in the aqueous or other medium. The amount of polymerizable constituents that are provided in the graft copolymerization system may be influenced somewhat by the manner in which it is intended to incorporate the product in the synthetic polymer compositions in order to provide the compositions of the invention.

If, for example, it is intended to incorporate the graft copolymer products by blending into a fiber-forming composition prior to its fabrication into shaped articles, the graft copolymerization system may, if desired, contain about equal proportions by weight of the charged polymerizable constituents and the polymerization medium which, preferably, is miscible with and tolerable in the spinning solution solvent being used. In such cases, the graft copolymer product may ordinarily be obtained as an easily dispersed gel that, after being dried and isolated from unreacted monomer, may readily be directly incorporated in the fiber-forming composition.

If the incorporation of the graft copolymeric additament in a fiber-forming composition is to be achieved by impregnation therewith of an already-formed shaped article of the composition, it may be desirable to effect the polymerization so as to directly form the polymerization system as a suitable applicating emulsion or suspension of the graft copolymeric product. For such purposes, the polymerization system may be prepared to contain as little as 5 or 10 weight percent of the graft copolymerizable monomeric and polymeric ingredients. Preferably, such a graft polymerization may be conducted under the influence of vigorous agitation to facilitate preparation of an emulsified or thoroughly dispersed product. It may also be beneficial under such circumstances to incorporate a dispersant or emulsifying agent in the polymerization system to facilitate obtaining a stable and homogeneous emulsified product. Such a method for preparing the graft copolymeric additaments that are employed in practice of the present invention may be especially appropriate when they are intended to be applied to acrylonitrile polymer fibers and the like that are derived from aquagels in the course of their manufacture, such as the acrylonitrile polymer fibers that are wet spun from aqueous saline solutions of the fiber-forming polymer.

In such instances, as has been demonstrated, the emulsified, water-insoluble, graft copolymeric additaments may be impregnated into the fiber while it is in a swollen or gel condition, as an acrylonitrile polymer fiber in an aquagel condition, in order to obtain the desired copolymer-containing product.

In this connection, when it is desired to blend the graft copolymeric additament in a synthetic polymer fiber-forming solution prior to its extrusion, such as an aqueous saline acrylonitrile polymer solution, the water-insoluble graft copolymer may be physically reduced by comminution to a sufficiently fine state to permit its dispersion in spinnable condition throughout the blended spinning solution in the event that it is otherwise insoluble in the solvent. While this may be accomplished by diverse techniques, it is generally advantageous to comminute the graft copolymer in the presence of the non-dissolving solvent, such as an aqueous saline polyacrylonitrile solvent, to form a stable suspension that may be more conveniently blended with the spinning solution of the synthetic polymer, such as an aqueous saline acrylonitrile polymer spinning solution. Thus, if the aqueous saline polyacrylonitrile solvent that is being employed is an aqueous solution of zinc chloride or its equivalant that contains at least about 55 weight percent and, preferably, about 60 weight percent of dissolved zinc chloride, it may be advantageous to comminute the graft copolymeric additament while it is in a mixture with the saline solvent solution that contains between about 5 and 10 weight percent of the copolymer. Analogous procedures may be employed when other solvents are involved.

Ball or rod mills or other attrition apparatus may be employed beneficially for the comminution. It is generally beneficial under such circumstances to avoid the use of balls or rods that are made of metal since they may contaminate the product, especially when aqueous saline solvents are utilized. Porcelain or other ceramic parts may usually be employed with advantage. A stable suspension of the graft copolymeric additament in the acrylonitrile polymer solvent that is suitable for blending in the spinning solution of the acrylonitrile polymer to provide a spinnable composition may usually be obtained by milling the mixture of graft copolymeric additament and solvent for an extended period that may exceed 100 hours. The suspension that is thereby obtained may then be directly blended in the proper proportions with the acrylonitrile polymer spinning solution to provide a composition in accordance with the present invention.

If desired, the graft copolymer-containing acrylonitrile polymer compositions may comprise as much as 20 or more percent by weight of the graft copolymeric additament, based on the weight of the composition. Usually, however, suitable properties and characteristics and better fiber-forming properties in a given composition may be achieved when lesser proportions of the graft copolymeric additament are incorporated therein. An appreciable improvement in dye-receptivity, antistatic properties and stability may frequently be obtained when a quantity of the graft copolymeric additament that is as small as 2 (and even as low as 1 or less) percent by weight is employed. Advantageously, an amount between about 4 and 15 percent by weight of the graft copolymeric additament may thus be utilized in the composition. Greater advantage may often accrue when the amount of the graft copolymeric additament that is incorporated in the composition is in the neighborhood of 5–10 percent by weight, based on the weight of the composition.

As has been indicated, the graft copolymeric additaments may be incorporated in the acrylonitrile polymer compositions according to various techniques. Thus, for example, the copolymeric additament and the acrylonitrile polymer may be directly blended in order to provide the composition which, incidentally, may be used for any desired fabrication purpose in addition to fiber-forming and the like. Beneficially, the polymers may be comminuted, either separately or in combination, before being intimately blended together by mechanical or other means. The blended polymers may be prepared into suitable fiber-forming systems by dissolving or otherwise dispersing them in a suitable liquid medium. Or, the compositions may be provided in fiber-forming system by sequentially dispersing the polymers in any desired order in a suitable medium, as by incorporating the copolymeric additament in a prepared acrylonitrile polymer spinning solution, dope or the like.

As is evident from the illustrative examples heretofore included, a highly advantageous technique for providing the compositions, particularly when acrylonitrile polymer fiber products are involved, is to apply or impregnate the copolymeric additament from an aqueous dispersion thereof to a shaped acrylonitrile polymer article that is in an aquagel condition in a known manner. Thus, an acrylonitrile polymer filamentary article that has been spun from an aqueous saline spinning solution may be conveniently passed, after its coagulation and while it is in an aquagel condition, through a water bath containing the dissolved graft copolymeric additament in order to impregnate the filament with the graft copolymer and provide a composition and an article in accordance with the invention. In addition, in situ polymerization techniques may also be relied upon to provide the copolymeric additament in the acrylonitrile polymers in either fabricated or unfabricated form.

The compositions of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funicular structures, ribbons, tapes, films, foils, sheets and the like which may be manufactured from synthetic polymeric materials. It is frequently desirable to employ concentrated solutions of salts or mixtures of salts as the dispersing or dissolving media for such purposes. Such solutions may, as has been indicated, contain at least about 55 percent by weight, based on the weight of the solution, of zinc chloride or other known saline solvents for the polymer. Acrylonitrile polymer fiber products that are spun from saline fiber-forming systems may, by way of further illustration, be coagulated in more dilute saline solution of a like or similar nature and may then be processed after coagulation according to conventional techniques of washing, stretching, drying, finishing and the like with the modification of the present invention being accomplished prior or subsequent to the spinning as may be desired and suitable in particular instances.

The acrylonitrile polymer fiber products in accordance with the present invention (one of which is schematically illustrated in the sole figure of the accompanying drawing) have excellent physical properties and other desirable characteristics for a textile material and have a high capacity for and are readily and satisfactorily dyeable to deep and level shades of coloration with any of a wide variety of dyestuffs. For example, they may be easily and successfully dyed according to conventional procedures using acid, vat, acetate, direct, basic, naphthol and sulfur dyes.

Such dyestuffs, by way of didactic illustration, as Calcocid Alizarine Violet (Colour Index 61710, formerly Colour Index 1080), Sulfanthrene Red 3B (Colour Index Vat Violet 2), Amacel Scarlet GB (Colour Index Direct Red 1—also known as Amacel Scarlet BS, and having American Prototype Number 244), Calcodur Pink 2BL (Colour Index 353, also more recently, Colour Index Direct Red 75), Naphthol ASMX (Colour Index 35527), Fast Red TRN Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the graft copolymer-containing, polymer blended fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A, Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. paste (Colour Index Vat Blue 5), and Sulfanthrene Red 3B paste (Colour Index Vat Violet 2); various soluble vat dyestuffs; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BN Conc. (Both Colour Index Dispersed Red 15), Celanthrene Pure Blue BRS 400 percent (Colour Index Dispersed Blue 1) and Acetamine Yellow N (Colour Index Dispersed Yellow 32); B-Naphthol←2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and various premetallized dyestuffs.

The dyed products are generally lightfast and stable to heat and are well imbued with a good resistance to crocking. In addition, the dyes products exhibit good washfastness and retain the dye-assisting copolymeric additament in a substantially permanent manner, despite repeated exposure and subjection to washing, laundering and dry cleaning treatments.

What is claimed is:

1. Composition comprising between about 80 and about 99 percent, based on composition weight, of (A) a fiber forming polymer of an ethylenically unsaturated monomeric material containing at least about 80 weight percent of acrylonitrile, and (B) between about 20 and about 1 weight percent, based on composition weight, of a graft copolymer of (a) from about 20 to about 80 weight percent, based on graft copolymer weight, of a mixture of monomers consisting of (1) from about 10 to about 90 mole percent of a vinyl pyridine monomer of the formula:

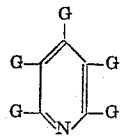

(I)

wherein one of the symbols G represents vinyl and the remainder are independently selected from the group consisting of hydrogen and alkyl groups containing from 1 to 3 carbon atoms; and (2) from about 90 to about 10 mole percent of at least one alkenyl group-containing organic sulfonic acid compound selected from the group consisting of those represented by the formulae:

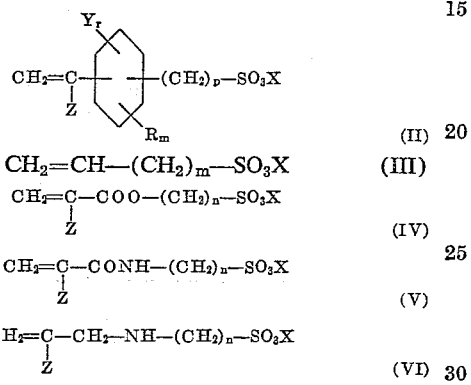

wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; with (b) from about 80 to about 20 weight percent, based on graft copolymer weight, of a copolymer of an N-vinyl-2-oxazolidinone and an N-vinyl lactam, said copolymer being from about 10 to about 90 weight percent, based on copolymer weight, of an N-vinyl-2-oxazolidinone monomer copolymerized with from about 90 to about 10 weight percent, based on copolymer weight, of an N-vinyl lactam monomer.

2. The composition of claim 1, wherein component (B) is a graft copolymer of styrene sulfonic acid and 2-vinyl pyridine on a copolymer of N-vinyl-5-methyl-2-oxazolidinone and N-vinyl-2-pyrrolidone.

3. The composition of claim 1, wherein component (B) is a graft copolymer of 2-sulfoethylacrylate and 2-vinyl pyridine on a copolymer of N-vinyl-5-methyl-2-oxazolidinone and N-vinyl-2-pyrrolidone.

4. The composition of claim 1, wherein component (B) is a graft copolymer of acryloyl taurine and 2-vinyl-4-methyl pyridine on a copolymer of N-vinyl-5-methyl-2-oxazolidinone and N-vinyl-2-pyrrolidone.

5. The composition of claim 1, wherein component (B) is a graft copolymer of styrene sulfonic acid and 2-vinyl-4-ethyl pyridine on a copolymer of N-vinyl-5-methyl-2-oxazolidinone and N-vinyl-2-pyrrolidone.

6. The composition of claim 1, wherein the acrylonitrile polymer is polyacrylonitrile.

7. The composition of claim 1 dispersed in a solvent for polyacrylonitrile.

8. A filamentary shaped article comprised of the composition of claim 1.

9. Method for the preparation of a dye-receptive, antistatic, stable to light and heat, synthetic, hydrophobic polymer composition which comprises immersing an aquagel of a fiber forming polymer of an ethylenically unsaturated monomeric material containing at least about 80 weight percent of acrylonitrile in the form of a shaped article into a dispersion of a graft copolymer of (a) from about 20 to about 80 weight percent, based on graft copolymer weight, of a mixture of monomers consisting of (1) from about 10 to about 90 mole percent of a vinyl pyridine monomer of the formula:

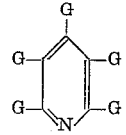

(I)

wherein one of the symbols G represents vinyl and the remainder are independently selected from the group consisting of hydrogen and alkyl groups containing from 1 to 3 carbon atoms; and (2) from about 90 to about 10 mole percent of at least one alkenyl group-containing organic sulfonic acid compound selected from the group consisting of those of the formulae:

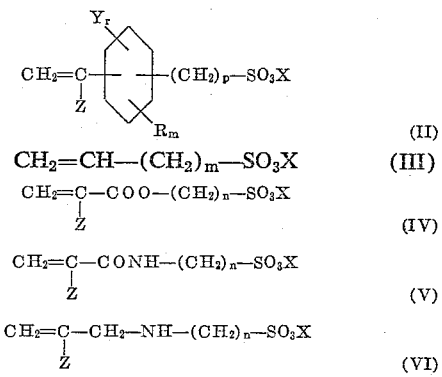

wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; and (b) between about 80 and about 20 weight percent, based on composition weight, of a copolymer of an N-vinyl-2-oxazolidinone and a N-vinyl lactam, said copolymer being a copolymer of from about 10 to about 90 weight percent, based on copolymer weight, of an N-vinyl-2-oxazolidinone monomer copolymerized with from about 90 to about 10 weight percent, based on copolymer weight, of an N-vinyl lactam monomer, until between about 1 and about 20 weight percent of said graft copolymer, based on resulting dry composition weight, is incorporated in said aquagel; and drying said graft copolymer-containing aquagel to convert it from the aquagel condition to a finished shaped article form.

10. The method of claim 9, wherein said acrylonitrile polymer is polyacrylonitrile.

11. The method of claim 9, wherein said copolymer is a copolymer of N-vinyl-5-methyl-2-oxazolidinone and N-vinyl-2-pyrrolidone.

12. A graft copolymer comprising between about 20 and about 80 weight percent of (a) a mixture of monomers consisting of (1) from about 10 to about 90 mole percent of a vinyl pyridine monomer of the formula:

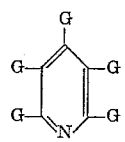

(I)

wherein one of the symbols G represents vinyl and the remainder are independently selected from the group consisting of hydrogen and alkyl groups containing from 1 to 3 carbon atoms; and (2) from about 90 to about 10 mole percent of at least one alkenyl group-containing organic sulfonic acid compound selected from the group of those represented by the formulae:

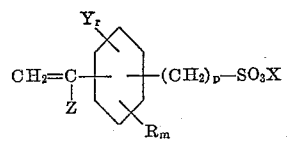
(II)

$$CH_2=CH—(CH_2)_m—SO_3X \quad (III)$$

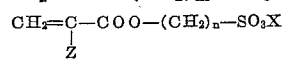
(IV)

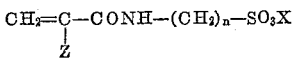
(V)

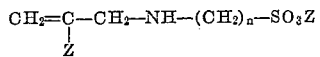
(VI)

wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; and (b) from about 80 to about 20 weight percent of a copolymer of an N-vinyl-2-oxazolidinone and an N-vinyl lactam, said copolymer being from about 10 to about 90 weight percent, based on copolymer weight, of an N-vinyl-2-oxazolidinone monomer copolymerized with from about 90 to about 10 weight percent, based on copolymer weight, of an N-vinyl lactam monomer.

13. The graft copolymer of claim 12, containing from about 20 to about 80 weight percent of about equal molar proportions of said mixture of monomers graft copolymerized upon from about 80 to about 20 percent of said copolymer.

14. The graft copolymer of claim 12, wherein said mixture of monomers consists of (1) from about 30 to about 70 mole percent of said vinyl pyridine monomer of said Formula I and (2) from about 70 to about 30 mole percent of at least one monomeric organic sulfonic acid compound selected from the group consisting of those represented by the Formulae II, III, IV, V and VI.

15. The graft copolymer of claim 12, wherein said copolymer is a copolymer of N-vinyl-5-methyl-2-oxazolidinone and N-vinyl-2-pyrrolidone.

16. Method for the preparation of a graft copolymer which comprises polymerizing with (b) from about 80 to about 20 weight percent, based on resulting graft copolymer weight, of an N-vinyl-2-oxazolidinone/N-vinyl lactam copolymer, said copolymer being from about 10 to about 90 weight percent, based on copolymer weight, of an N-vinyl-2-oxazolidinone monomer copolymerized with from about 90 to about 10 weight percent, based on copolymer weight, of an N-vinyl lactam monomer, between about 20 and about 80 weight percent of (a) a mixture of monomers consisting of (1) from about 10 to about 90 mole percent of a vinyl pyridine monomer of the formula:

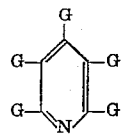
(I)

wherein one of the symbols G represents vinyl and the remainder are independently selected from the group consisting of hydrogen and alkyl groups containing from 1 to 3 carbon atoms; and (2) from about 90 to about 10 mole percent of at least one monomeric organic sulfonic acid compound selected from the group consisting of those represented by the formulae:

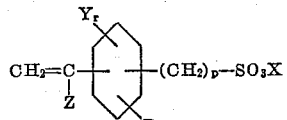
(II)

$$CH_2=CH—(CH_2)_m—SO_3X \quad (III)$$

(IV)

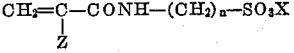
(V)

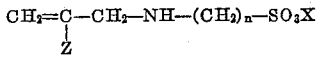
(VI)

wherein X is selected from the group consisting of hydrogen, saturated aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4.

References Cited in the file of this patent

UNITED STATES PATENTS 2,614,289     Cresswell et al. _____ Oct. 21, 1952